(12) United States Patent
Hashimoto

(10) Patent No.: US 10,649,677 B2
(45) Date of Patent: *May 12, 2020

(54) COOPERATIVE PHYSICAL DEFRAGMENTATION BY A FILE SYSTEM AND A STORAGE DEVICE

(71) Applicant: Toshiba Memory Corporation, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,179

(22) Filed: Feb. 13, 2019

(65) Prior Publication Data

US 2019/0179557 A1  Jun. 13, 2019

Related U.S. Application Data

(63) Continuation of application No. 15/253,643, filed on Aug. 31, 2016, now Pat. No. 10,235,079.

(Continued)

(51) Int. Cl.
*G06F 3/06* (2006.01)
*G06F 12/02* (2006.01)

(52) U.S. Cl.
CPC ............ *G06F 3/0641* (2013.01); *G06F 3/061* (2013.01); *G06F 3/064* (2013.01); *G06F 3/0604* (2013.01); *G06F 3/0611* (2013.01); *G06F 3/0659* (2013.01); *G06F 3/0665* (2013.01); *G06F 3/0679* (2013.01); *G06F 12/0246* (2013.01); *G06F 2206/1004* (2013.01); *G06F 2212/1016* (2013.01); *G06F 2212/1044* (2013.01); *G06F 2212/152* (2013.01); *G06F 2212/214* (2013.01); *G06F 2212/7201* (2013.01); *G06F 2212/7205* (2013.01)

(58) Field of Classification Search
CPC ...... G06F 3/0604; G06F 3/061; G06F 3/0641; G06F 3/0659; G06F 3/0665; G06F 3/0679; G06F 12/0246; G06F 2212/1016; G06F 2212/1044; G06F 2212/152; G06F 2212/214; G06F 2212/7201; G06F 2212/7205

See application file for complete search history.

(56) References Cited

U.S. PATENT DOCUMENTS 6,237,072 B1 * 5/2001 Houlsdworth ...... G06F 12/0253
 711/171
8,032,724 B1  10/2011 Smith
(Continued)

OTHER PUBLICATIONS

U.S. Appl. No. 62/138,315, filed Mar. 25, 2015.
(Continued)

*Primary Examiner* — Aracelis Ruiz
(74) *Attorney, Agent, or Firm* — Kim & Stewart LLP

(57) ABSTRACT

A storage system includes a host including a processor and a storage device including a controller and a flash memory unit. The host is configured to read physically fragmented data of a file stored in one or more physical storage regions of the flash memory unit and write the data continuously into other one or more physical regions of the flash memory unit, such that the data are physically defragmented.

20 Claims, 14 Drawing Sheets

Related U.S. Application Data

(60) Provisional application No. 62/290,843, filed on Feb. 3, 2016.

(56) References Cited

U.S. PATENT DOCUMENTS

| | | | |
|---|---|---|---|
| 8,156,263 | B2 | 4/2012 | Uehara |
| 8,364,918 | B1 | 1/2013 | Smith |
| 8,386,537 | B2 | 2/2013 | Boyd et al. |
| 8,626,987 | B2 * | 1/2014 | Jung .................. G06F 12/0246 |
| | | | 711/103 |
| 8,874,872 | B2 | 10/2014 | Feldman et al. |
| 2008/0005524 | A1 | 1/2008 | Worrall |
| 2008/0263305 | A1 | 10/2008 | Shu et al. |
| 2010/0312983 | A1 * | 12/2010 | Moon ..................... G06F 3/061 |
| | | | 711/170 |
| 2011/0099326 | A1 | 4/2011 | Jung et al. |
| 2011/0271037 | A1 | 11/2011 | Oh et al. |
| 2012/0246388 | A1 | 9/2012 | Hashimoto |
| 2012/0265934 | A1 | 10/2012 | Gupta |
| 2013/0254509 | A1 | 9/2013 | Patil et al. |
| 2014/0223083 | A1 * | 8/2014 | Park .................... G06F 12/0246 |
| | | | 711/103 |
| 2014/0229657 | A1 | 8/2014 | Karamov et al. |
| 2015/0242310 | A1 | 8/2015 | Guo et al. |
| 2016/0170903 | A1 | 6/2016 | Kanno et al. |

OTHER PUBLICATIONS

U.S. Appl. No. 62/142,937, filed Apr. 3, 2015.
U.S. Appl. No. 62/145,970, filed Apr. 10, 2015.
U.S. Appl. No. 62/152,372, filed Apr. 24, 2015.
U.S. Appl. No. 62/153,655, filed Apr. 28, 2015.

* cited by examiner

US 10,649,677 B2

COOPERATIVE PHYSICAL DEFRAGMENTATION BY A FILE SYSTEM AND A STORAGE DEVICE

CROSS-REFERENCE TO RELATED APPLICATION

This application is a continuation of U.S. patent application Ser. No. 15/253,643, filed Aug. 31, 2016, now U.S. Pat. No. 10,235,079, issued Mar. 19, 2019, which is based upon and claims the benefit of priority from U.S. Provisional Patent Application No. 62/290,843, filed Feb. 3, 2016, the entire contents of which are incorporated herein by reference.

FIELD

The present disclosure generally relates to a storage system including a host and a storage device, in particular, a storage system that carries out defragmentation of data.

BACKGROUND

Conventionally, an operation system (OS) or a file system may carry out defragmentation of data stored in a storage device, such as NAND flash memory. FIG. 1 schematically illustrates an example of a logical defragmentation operation carried out by a file system. (a) of FIG. 1 illustrates data fragmented as a result of data modification. When data of a file (e.g., "abc.dat") are generated, the data are sequential in each of the file system, a logical address space (LBA space), and a physical address space, as shown as data A in (a) of FIG. 1. When part of data A of the file is modified (overwritten), a new LBA region, which may be not sequential to the LBA region of the data A, is assigned for the modified data (data B). Also, the data B is written into a new physical address, which may be not sequential to the physical address region of the data A, as shown in (a) of FIG. 1.

(b) of FIG. 1 illustrates states of the file system, the LBA space, and the physical address space after the defragmentation is carried out by the OS or the file system. As shown in (b) of FIG. 1, through the defragmentation, the LBA region of the data B is moved to a LBA region that is sequential to the LBA region of the data A. In accordance with the move of the LBA region, the data B may be written into another physical address associated with the new LBA region. Since the LBA regions of the file are sequential, the file can be accessed more quickly and more efficiently.

DETAILED DESCRIPTION

A storage system according to an embodiment is directed to carrying out a physical defragmentation of data stored in physical blocks of a storage device through a defragmentation operation performed cooperatively by a file system and a storage device.

According to an embodiment, a storage system includes a host including a processor, and a storage device including a controller and a flash memory unit. The host is configured to read physically fragmented data of a file stored in one or more physical storage regions of the flash memory unit and write the data continuously into other one or more physical regions of the flash memory unit, such that the data are physically defragmented.

Details of the present disclosure are described below with reference to drawings.

[Storage System]

Figure 2:
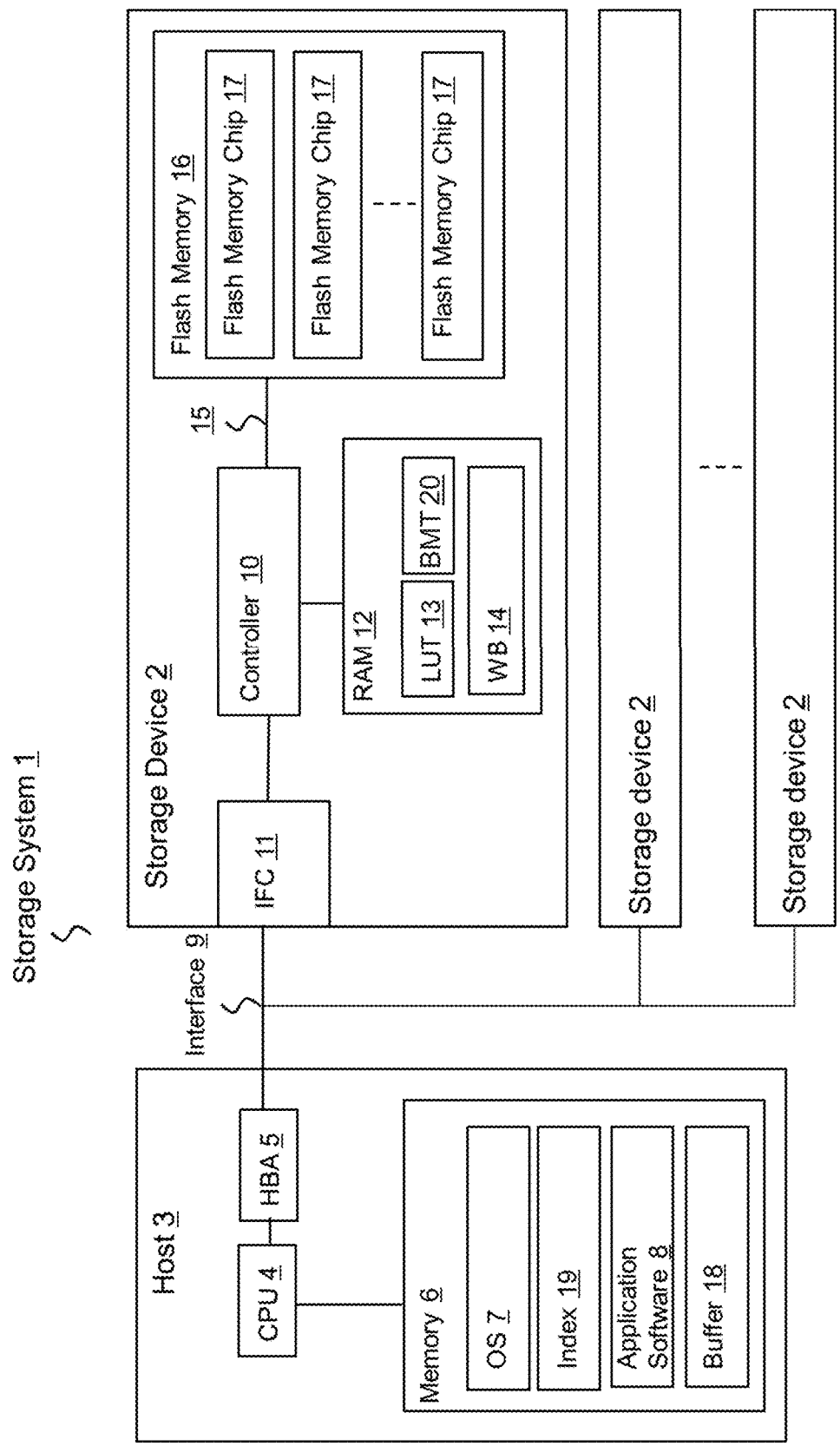
FIG. 2 illustrates a configuration of a storage system according to an embodiment.

FIG. 2 illustrates a configuration of a storage system according to an embodiment. A storage system 1 shown in FIG. 2 includes a host 3, one or more storage devices 2 connected to the host 3, and an interface 9 configured to connect the host 3 and each storage device 2. In the present embodiment, a SSD (Solid State Drive), which is a non-volatile storage device, is used as the storage device 2. However, the storage device 2 can be other storage devices such as a hard disk drive (HDD), a hybrid drive, a SD card, a USB memory, an embedded Multi Media Card (eMMC), and a storage device and a memory node described in United States Patent Application Publication No. 2012/0117354. In the following description of the present embodiment, a SAS (Serial Attached SCSI) interface is used as the interface 9. Alternatively, a PCI Express (Peripheral Component Interconnect Express, PCIe), a USB (Universal Serial Bus), a SATA (Serial Advanced Technology Attachment), a Thunderbolt (registered trademark), an Ethernet (registered trademark), a Fibre channel, and the like can be used. A CPU (a control circuit) 4 is a central processing unit in the host 3. Various calculations and controls in the host 3 are performed by the CPU 4. The CPU 4 and a host bus adapter (HBA) 5 are connected through an interface such as a PCI Express. The CPU 4 performs control of the storage device 2 via the HBA 5. The CPU 4 also performs control of memory 6 located in the host 3. As the memory 6, for example, a DRAM (Dynamic Random Access Memory), a MRAM (Magnetoresistive Random Access Memory), a ReRAM (Resistance Random Access Memory), and a FeRAM (Ferroelectric Random Access Memory) can be used.

The CPU 4 is a processor configured to control operations of the host 3. The CPU 4 executes, for example, an operating system (OS) 7 loaded from one of storage devices 2 to the memory 6.

The memory 6 temporarily stores a program and data and functions as a work memory of the CPU 4. The memory 6 includes a storage region for storing the OS 7, application software 8, an index 19 that indicates mapping from file IDs to LBAs, and a buffer (data buffer) 18. As generally known, the OS 7 represents system software for managing the host 3, and may be a commodity OS such as Linux, Windows, or a virtualization software available from VMware, Inc. The OS 7 operates to manage an input and output device of the host 3, managing the storage devices 2 and the memory 6, and enabling software running over the OS 7 to use hardware, including the storage devices 2. The OS 7 contains a file system to manage how data are stored in the storage devices 2 and retrieved (read) from the storage device 2. The file system operates to store index data, journaling data, and metadata in the index 19 stored in the memory 6. For example, ZFS, Btrfs, XFS, ext4, and NTFS are used as the file system. Alternatively, object storage system (such as Ceph Object Storage Daemon) and Key Value Store System (such as Rocks DB) can be used as the file system.

The host 3 accesses the storage devices 2 by transmitting commands. In the present embodiment, a variety of commands such as a write command, a read command, an unmap command (trim command), a flush command, an open stream command, a start host-initiated garbage collection (Start HIGC) command, a get physical fragmentation information (GPFI) command, and the like are input to the storage devices 2 via the interface 9.

Figure 3:
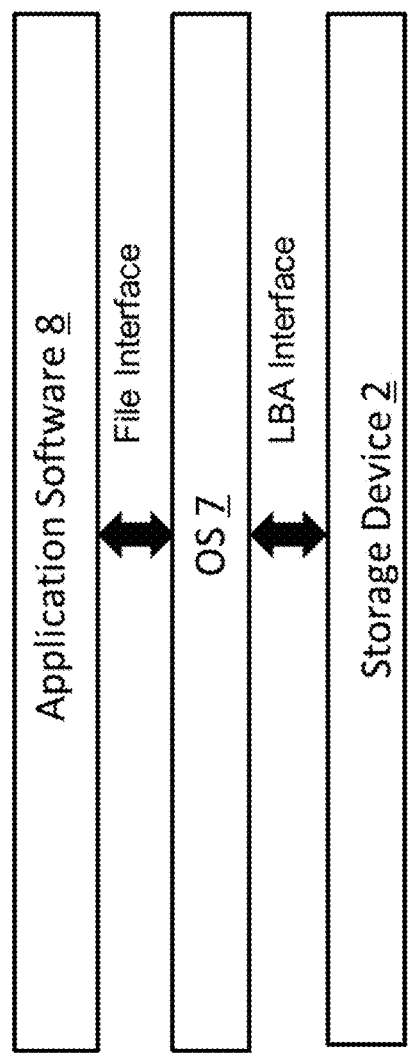
FIG. 3 illustrates a software layer structure of the storage system according to the embodiment.

FIG. 3 illustrates a software layer structure of the storage system 1. Usually, application software 8 loaded on the memory 6 does not directly communicate with the storage devices 2 and instead communicates with the storage devices 2 through the OS 7 loaded to the memory 6. When the application software 8 needs to transmit a request such as a read request or a write request to a storage device (target storage device) 2, the application software 8 transmits the request to the OS 7 in accordance with a file interface. Then, the OS 7 specifies a logical block address (LBA: Logical block Address) of the target storage device 2 corresponding to the access-requested data, and transmits a command and the LBA (and data to be written) to the target storage device 2 via the interface 9. Upon receiving a response from the target storage device 2, the OS 7 transfers the response to the application software 8.

A variety of application software threads may run in the application software 8, Example of the application software threads include client software, database software (such as Cassandra DB, Mongo DB, HBASE and etc.), Distributed Storage System (Ceph etc.), Virtual Machine (VM), guest OS, and Analytics Software (such as Hadoop, R and etc.).

[Storage Device]

A configuration of the storage device 2 will be described below. In the present embodiment, as shown in FIG. 2, one of the storage devices 2 includes a NAND flash memory (hereinafter abbreviated as flash memory) 16 functioning as a non-volatile semiconductor memory, an interface controller (IFC) 11 configured to perform transmission and reception of signals to and from the host 3 via the interface 9, a RAM (Random Access Memory) 12 functioning as a semiconductor memory, a controller 10 configured to manage and control the flash memory 16, the RAM 12, and the IFC 11. The RAM 12 includes storage regions for storing a look-up table (LUT) 13, which is used to manage mapping between LBAs and physical addresses of the flash memory 16, a write buffer (WB) 14, and a block mapping table (BMT) 20, which is used to map physical blocks of the flash memory 16 in accordance with operations carried out therein.

As the RAM 12, for example, a volatile RAM such as a DRAM (Dynamic Random Access Memory) or a SRAM (Static Random Access Memory) or a nonvolatile RAM such as a Fe RAM (Ferroelectric Random Access Memory), a MRAM (Magnetoresistive Random Access Memory), a PRAM (Phase Change Random Access Memory), or a ReRAM (Resistance Random Access Memory) can be used. The RAM 12 can be embedded in the controller 10. The flash memory 16 includes a plurality of flash memory chips 17. The flash memory 16 stores user data received from the host 3. The controller 10 and the flash memory 16 are connected via a flash memory interface 15 such as Toggle I/F and ONFI I/F.

[Flash Memory Chip]

Figure 4:
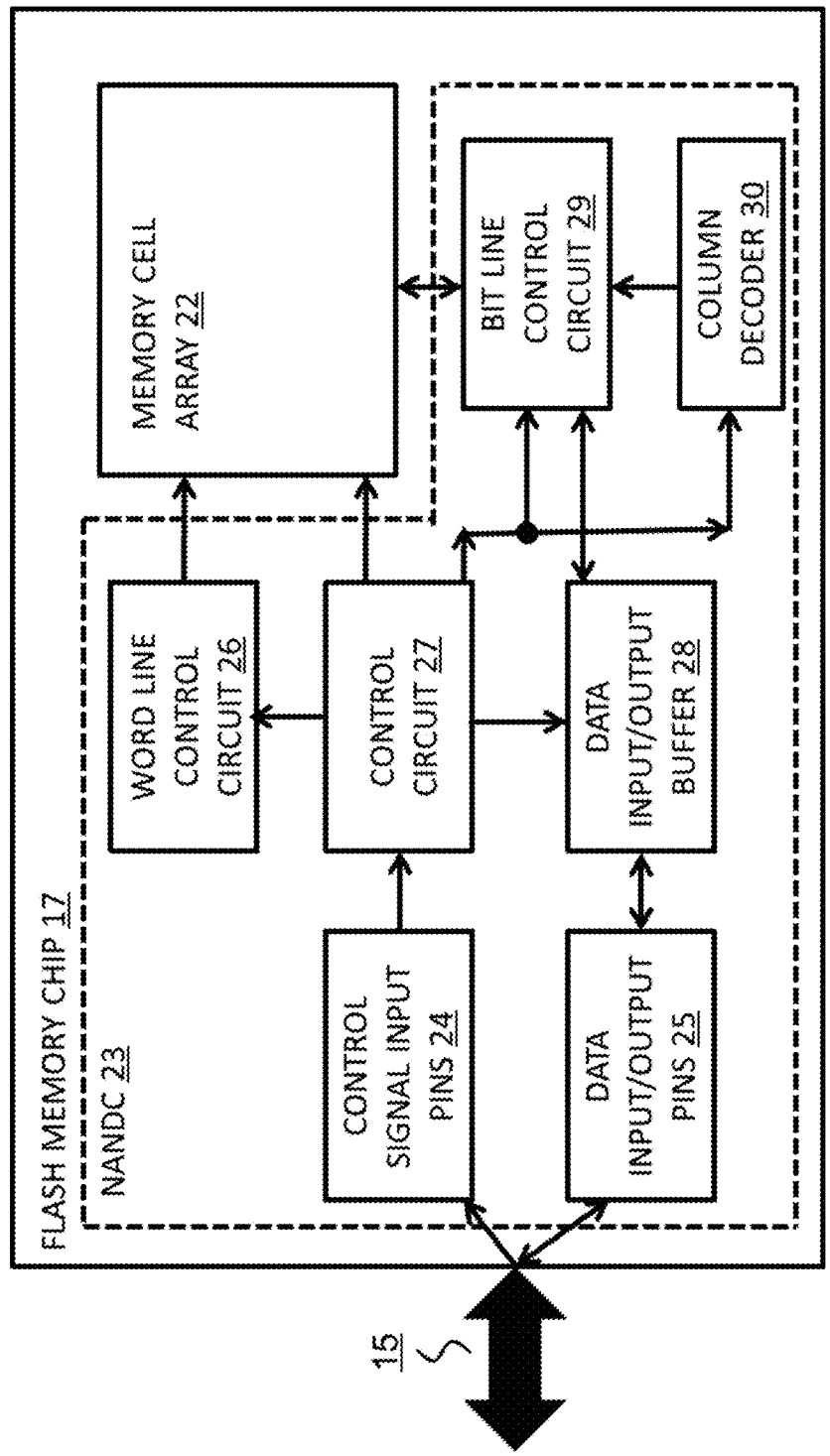
FIG. 4 illustrates a configuration of a flash memory chip in a storage device of the storage system.
Figure 5:
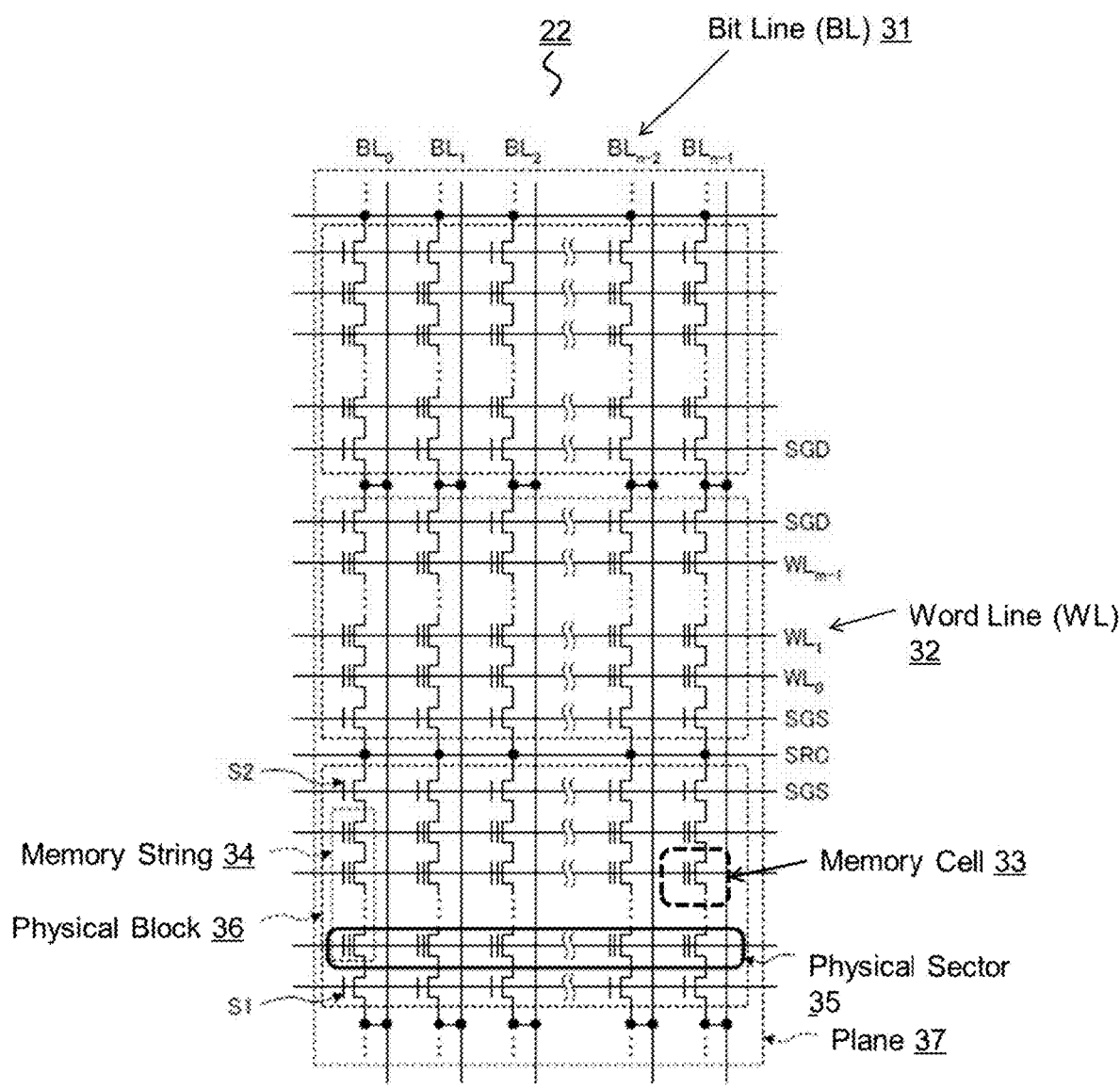
FIG. 5 illustrates a detailed circuit structure of a memory cell array in the flash memory chip.

FIG. 4 illustrates an internal configuration of each of the flash memory chips 17. Each of the flash memory chips 17 includes a memory cell array 22 configured by arranging a plurality of memory cells 33 for storing data in a matrix configuration as shown in FIG. 5. The memory cell array 22 includes a plurality of bit lines 31, a plurality of word lines 32, and a common source line. The memory cells 33, which are electrically data-rewritable, are arranged in a matrix configuration at intersections of the bit lines 31 and the word lines 32. A bit line control circuit 29 for controlling the bit lines 31 and a word line control circuit 26 for controlling the word lines 32 are connected to the memory cell array 22. That is, the bit line control circuit 29 reads data stored in memory cells 33 of the memory cell array 22 via the bit lines 31 and applies a write control voltage to the memory cells 33 of the memory cell array 22 via the bit lines 31 to write data in the memory cells 33.

A column decoder 30, a data input/output buffer 28, and data input/output pins 25 are connected to the bit line control circuit 29. The data read from the memory cells 33 of the memory cell array 22 are output to the flash interface 15 from the data input/output pins 25 via the bit line control circuit 29 and the data input/output buffer 28. Write data input to the data input/output pins 25 from flash interface 15 are input to the bit line control circuit 29 by the column decoder 30 via the data input/output buffer 28 and written into designated memory cells 33.

The memory cell array 22, the bit line control circuit 29, the column decoder 30, the data input/output buffer 28, and the word line control circuit 26 are connected to the control circuit 27. The control circuit 27 generates, according to a control signal input to control signal input pins 24, control signals and control voltages for controlling the memory cell array 22, the bit line control circuit 29, the column decoder 30, the data input/output buffer 28, and the word line control circuit 26. A circuit section other than the memory cell array 22 in the flash memory chip 17 is referred to as a NAND controller (NANDC) 23.

FIG. 5 shows a configuration of the memory cell array 22 shown in FIG. 4. In the present embodiment, the memory cell array 22 is a NAND-cell-type memory cell array and includes a plurality of NAND cells 33. The memory cell array 22 includes one or a plurality of memory strings (MSs) 34 formed by a plurality of memory cells 33 connected in series and first and second selection gates S1 and S2 connected to both ends of each memory string 34. The first selection gate S1 is connected to a bit line BL 31 and the selection gate S2 is connected to a source line SRC. Control gates of memory cells 32 arranged in a same row are connected in common to word lines 32 WL0 to WLm-1. The first selection gates S1 are connected in common to a select line SGD, and second selection gates S2 are connected in common to a select line SGS.

The memory cell array 22 includes one or more planes 37. Each of the planes includes a plurality of physical blocks 36. Each of physical blocks 36 includes a plurality of NAND cells. Data are erased in unit of one physical block 36.

A plurality of memory cells 33 connected to one word line 32 forms one physical sector 35. Data are written and read with respect to each physical sector 35. In one physical sector 35, for example, data equivalent to two physical pages (two pages) are stored in the case of a 2-bit/cell write system (MLC, four-level). On the other hand, in the case of a 1-bit/cell write system (SLC, two-level), for example, data equivalent to one physical page (one page) are stored in one physical sector 35. In the case of a 3-bit/cell write system (TLC, eight-level), for example, data equivalent to three physical pages (three pages) are stored in one physical sector 35.

During a read operation, a program verify operation, and a program operation, one word line is selected and one physical sector is selected according to a physical address such as a Row Address received from the controller 10. Switching of a page in the physical sector is performed according to a physical page address of a physical address. In the present embodiment, the flash memory 16 employs the 2-bit/cell write system, and the controller 10 handles the physical sectors, assuming that two pages, i.e., an upper page and a lower page, are allocated to each of the physical sectors as physical pages. The physical address comprises a physical page address and a physical block address. The physical page addresses are assigned to all physical pages, and physical block addresses are assigned to all physical blocks in advance.

Figure 6:
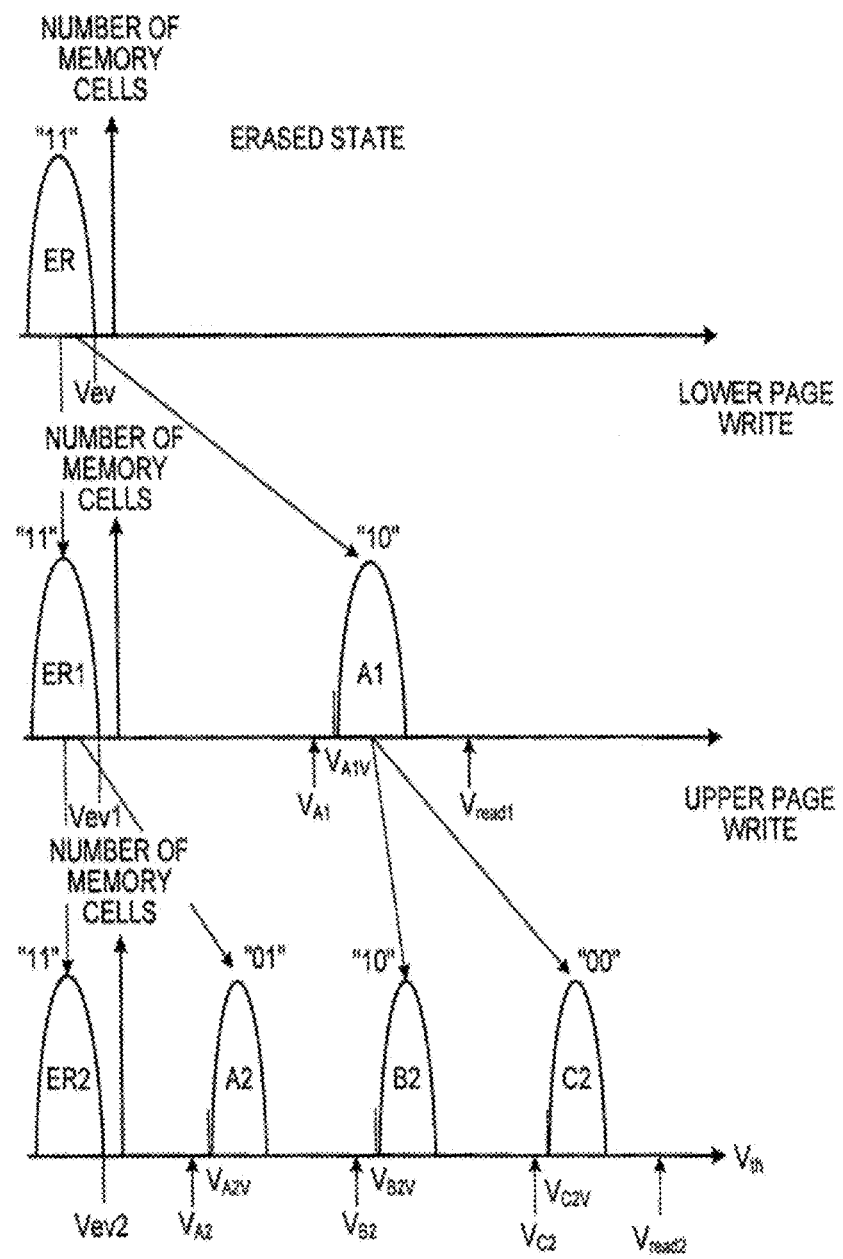
FIG. 6 illustrates a relation between 2-bit four-level data (data "11", "01", "10", and "00") stored in a memory cell of a four-level NAND cell type and a threshold voltage distribution of each level.

The four-level NAND memory of 2-bit/cell is configured such that a threshold voltage in one memory cell could have four kinds of distributions. FIG. 6 shows a relation between 2-bit four-level data (data "11", "01", "10", and "00") stored in the memory cells 33 of a four-level NAND-cell-type flash memory and a threshold voltage distribution of the memory cells 33.

2-bit data of one memory cell includes lower page data and upper page data. The lower page data and the upper page data are written in the memory cell according to separate write operations, i.e., two write operations. When data are represented as "XY", X represents the upper page data and Y represents the lower page data.

A memory cell transistor included in each of the memory cells 33 is configured by a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data according to a difference in the threshold voltage.

In the present embodiment, each of the memory cells 33 employs the four-level write system (2 bit/cell (MLC)) for storing data using an upper page and a lower page. However, the essence of the present invention is the same even when the memory cells 33 employ the two-level writing system (1 bit/cell (SLC)) for writing data using a single page, an eight-level write system (3 bit/cell (TLC)) for writing data using an upper page, a middle page, and a lower page, or multi-level writing system (4 bit/cell (QLC) or more), or the mix of them. The memory cell transistor is not limited to the structure including the floating gate electrode and can be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store one bit or can be configured to store a multi-level. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191.

[Block Mapping]

Figure 7:
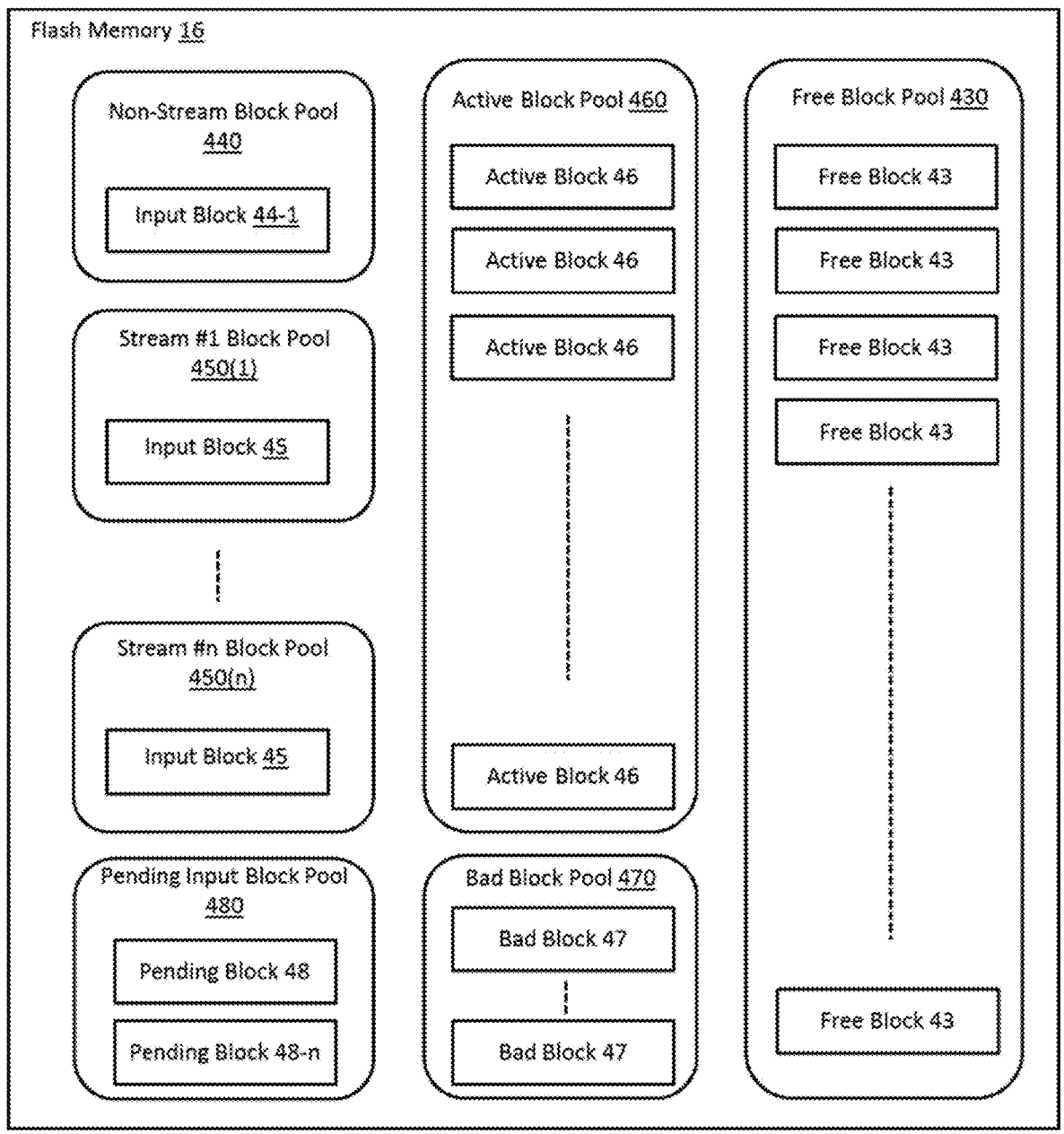
FIG. 7 illustrates an overview of the mapping of the physical blocks based on block pools.

According to the present embodiment, the controller 10 of the storage device 2 manages physical blocks of the flash memory 16, by logically mapping the block in one of block pools, using the BMT 20 (shown in FIG. 2). FIG. 7 illustrates an overview of the mapping of the physical blocks based on block pools. The block pools here includes a free block pool 430, a non-stream block pools 440, stream block pools 450(1)-450(n), active block pool 460, and a bad block pool 470. The controller 10 maps each of the physical blocks 36, in the BMT 20, based on whether or not data are stored in the block and a type of data stored in the block, if so.

When no data are stored in a block, then the controller 10 maps the block as a free block 43 and maps the free block 43 in the free block pool 430. That is, free blocks 43 in the free block pool 430 are physical blocks that do not store data. When the block has a space in which write data are supposed to be written, then the controller 10 maps the block as an input block 44(45) and maps the input block 44(45) in the non-stream block pool 440 or the stream block pool 450. That is, input blocks 44 and 45 are partially written physical blocks where the controller 10 can write data without erasing it. In other words, there is an unwritten space in the input blocks 44 and 45. When the input block 44(45) becomes full, then the controller 10 remaps the input block 44(45) as an active block 46 and maps the active block 46 in the active block pool 460. That is, active blocks 46 are physical blocks that store valid data. When a block is defective, then the controller 10 maps the defective block as a bad block 47 and maps the bad block 47 in the bad block pool 470. That is, bad blocks 47 are physical blocks that are no longer usable for storing data.

In such a manner, the BMT 20 (shown in FIG. 2) is used to manage a physical block address list of the free blocks 43, the input blocks 44 and 45, the active blocks 46, and the bad blocks 47, respectively. In addition the types of blocks described above, another type of block may be also managed in the BMT 20.

Here, according to the present embodiment, the block pools include stream block pools 450(1)-450(n), and in each of the stream block pools 450(1)-450(n), a different one of input blocks 45 is mapped. Further, each of the input blocks 45 is associated with a different stream identification code (stream ID). When write data are associated with a stream ID, then the write data are input in one of the input blocks 45 that is associated with the same stream ID. Thus, in order to write the write data associated with the stream ID, an input block associated with the same stream ID has to be mapped.

[Write Operation]

When the host 3 transmits a read command or a write command 40, to the storage device 2, the host 3 transmits a logical address via the interface 9. In the present embodiment, LBA is used as the logical address, but Object ID can be alternatively used as the logical address. The LBA is a logical address in which serial numbers are given to each logical sector (size: e.g., 512 Bytes) starting from 0. When the host 3 issues the read command or the write command, to the storage device 2, the host 3 transmits the command together with the LBA and a logical sector count (number of logical sectors) for which the read request or the write request is issued. Mappings between LBAs and physical addresses are dynamic, and the controller 10 stores the mapping information in the LUT 13.

Figure 8:
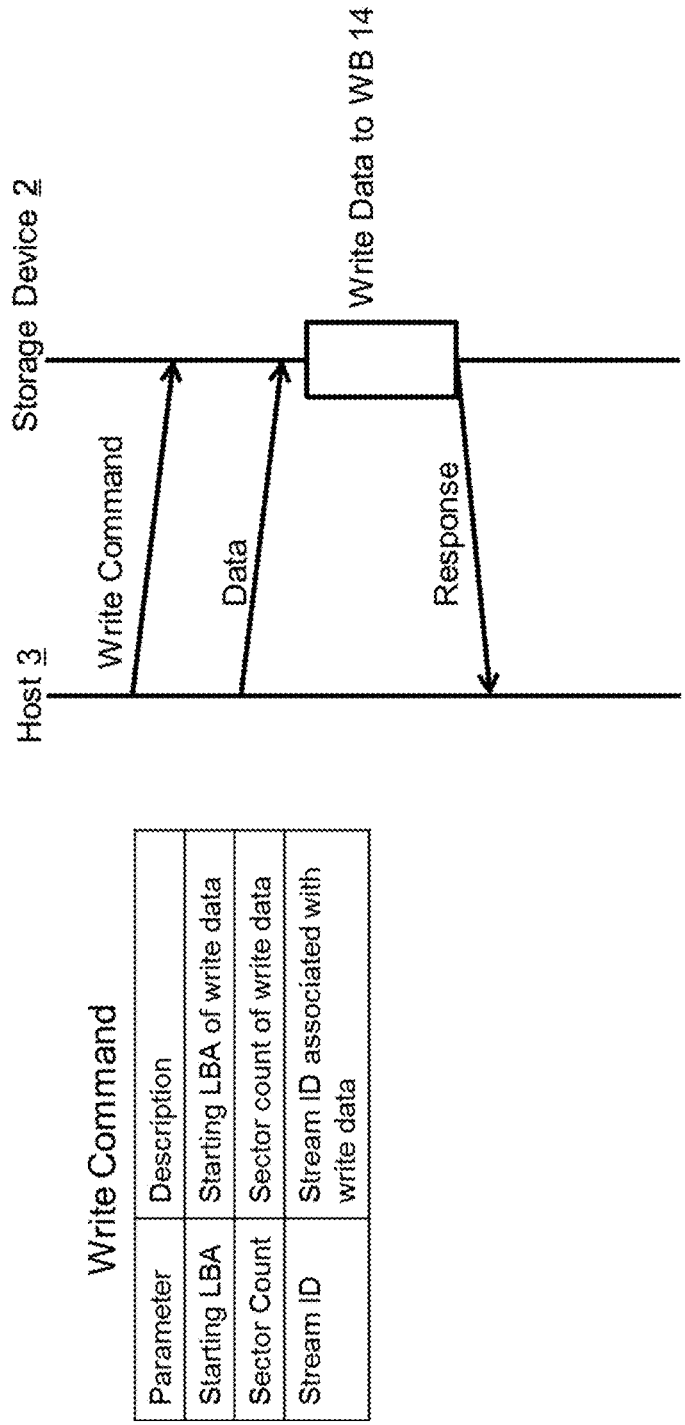
FIG. 8 illustrates a data structure of a write command and a sequence diagram of a write operation.

FIG. 8 illustrates a data structure of a write command and a sequence diagram of a write operation. The write command comprises a starting LBA of data to be written (write data), a sector count of the write data, and a stream ID. In the write operation, the host 3 transmits a write command 40 to the storage device 2 via the interface 9, the host 3 transmits write data to the storage device 2, the controller 10 writes the write data into the WB 14 and the controller 10 notifies a command completion to the host 3.

Figure 9:
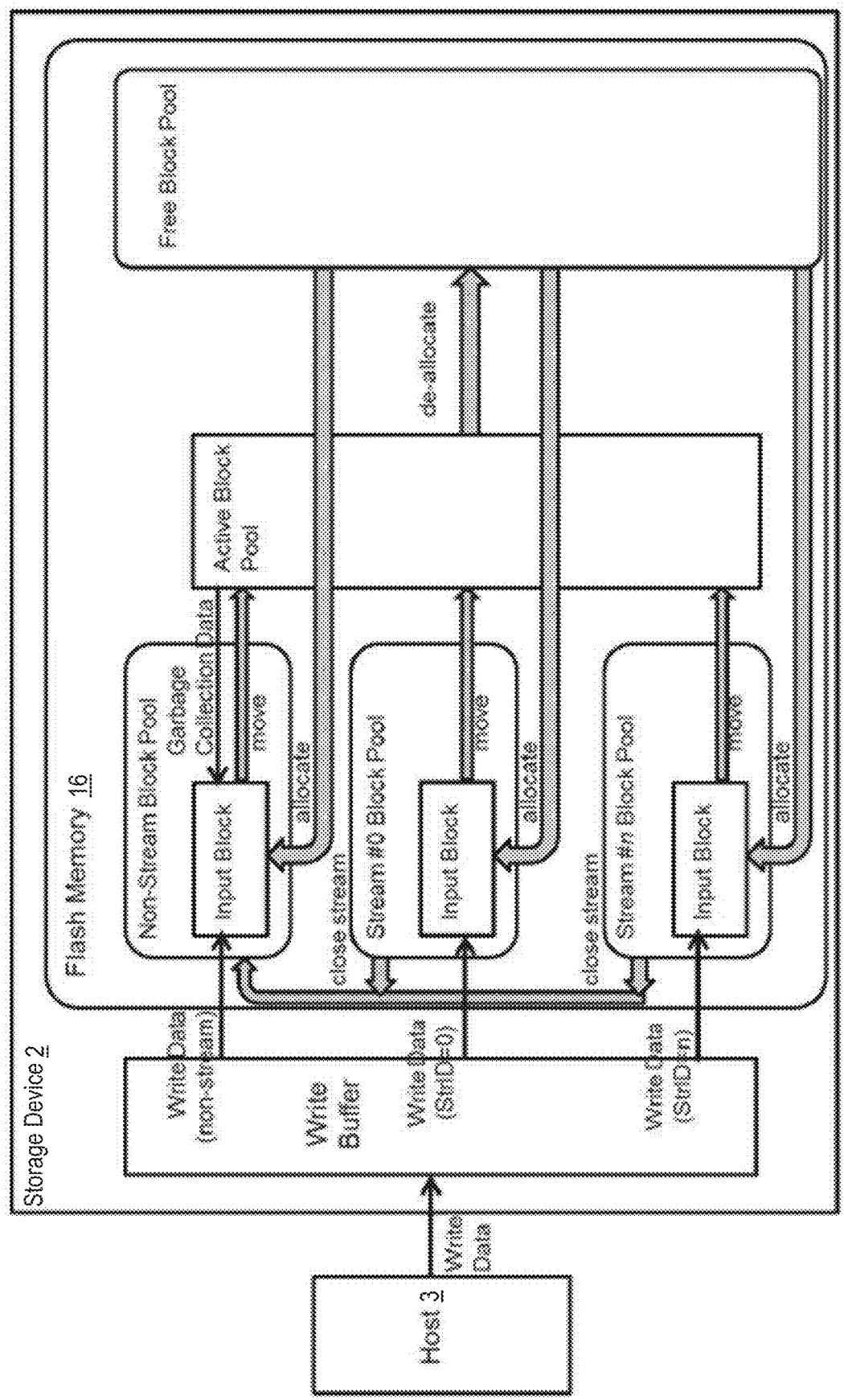
FIG. 9 shows an architecture overview of the storage device during a write operation.

FIG. 9 shows an architecture overview of the storage device 2 during a write operation, during which the controller 10 writes the write data from the WB 14 into the flash memory 16. Solid arrows in FIG. 9 indicate data flow of the write operation, and gray-hatched arrows in FIG. 9 indicate state transitions of physical blocks.

When the controller 10 writes data from the WB 14 into the flash memory 16, the controller 10 selects a stream block pool 450 corresponding to the stream ID included in the write command and writes the write data in an input block 45 in the selected stream block pool 450. When a stream ID is not specified in the write command (e.g., not included in the write command), the controller 10 selects the non-stream block pool 440 instead of the stream block pool 450. If there is no available input block 44 (or 45) in the stream block pool 450 (or the non-stream block pool 440), the controller 10 allocates a new input block 44 (or 45) from the free block pool 430 to the selected stream block pool 450 or the selected non-stream block pool 440. When the input block 44 (45) becomes full with the write data, then the controller 10 remaps the full input block 44 (45) as an active block in the active block pool 460. When the controller 10 carries out a garbage collection operation of the flash memory 16, the controller 10 carries out a data copy operation, so as to transfer data from one or more input blocks 50 and active blocks 46 in the active block pool 460 to other input blocks 44 (45) and the free blocks 430 in the free block pool 430. When all data in an active block 43 is invalidated through the garbage collection operation or a trim operation carried out in accordance with a trim command, the controller 10 remaps the invalidated active block 46 as a free block 43.

According to the above-described architecture of the stream-based data writing, data stored in each of the stream blocks 45 of the stream block pools 450 can be sorted out based on the types or attributes of the data. For example, system data and user data may be written into different stream blocks 45 associated with different stream ID, and frequently-accessed data and less-frequently-accessed data may be written into different stream blocks 45 associated with different stream ID. As a result, the write operation and the garbage collection operation can be carried out more efficiently.

[Device Initiated Garbage Collection (DIGC)]

When there is not enough amount of free blocks 43 in the free block pool 430, the controller 10 carries out a device-initiated garbage collection (DIGC) operation to create free blocks 43 in the free block pool 430, by remapping some of the active blocks 46 in the active block pool 460. That is, the device-initiated garbage collection is initiated by the storage device 2, not by the host 3.

Figure 10:
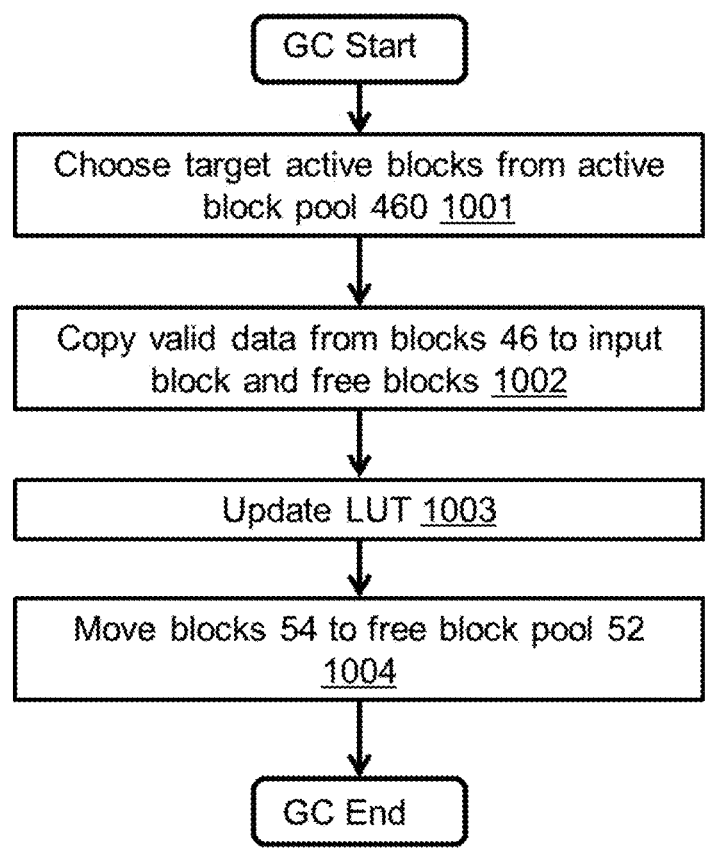
FIG. 10 illustrates a flowchart of the device-initiated garbage collection.

FIG. 10 illustrates a flowchart of the device-initiated garbage collection. When the device-initiated garbage collection starts, in step 1001, the controller 10 selects one or more active blocks 46 to be subjected to the device-initiated garbage collection (target active blocks) from the active block pool 460. Various types of algorithms can be employed to select the target active blocks 46 in step 1001. According to an embodiment, the controller 10 may select the target active block(s) 46 out of the active block pool 460 based on a ratio of invalid data (i.e., active block(s) 46 containing more invalid data are selected). According to another embodiment, the controller 10 may select the target active block(s) 46 in a first-in-first-out (FIFO) manner, in which the target active block(s) 46 are selected based on the time at which each block was remapped as an active block (i.e., the oldest active block 46 is selected as the target active block).

In step 1002, the controller 10 copies only valid data from the target active blocks 46 to one or more input blocks (44) and/or free blocks 43 in the free block pool 430. When the data are copied to free blocks 43, the controller 10 remaps each of the free blocks 43 as an active block 46, if the block becomes full, or an input block 45 (44), if the block has remaining capacity.

In step 1003, the controller 10 updates the LUT 13 so as to reflect changes in the correspondence between LBAs and physical addresses of blocks to which the valid data are copied. In step 1004, the controller 10 remaps the target active block(s) 46 as free block(s) 45. As a result, the number of free blocks 43 in the free block pool 430 is increased through the device-initiated garbage collection.

[Host Initiated Garbage Collection (HIGC)]

Figure 11:
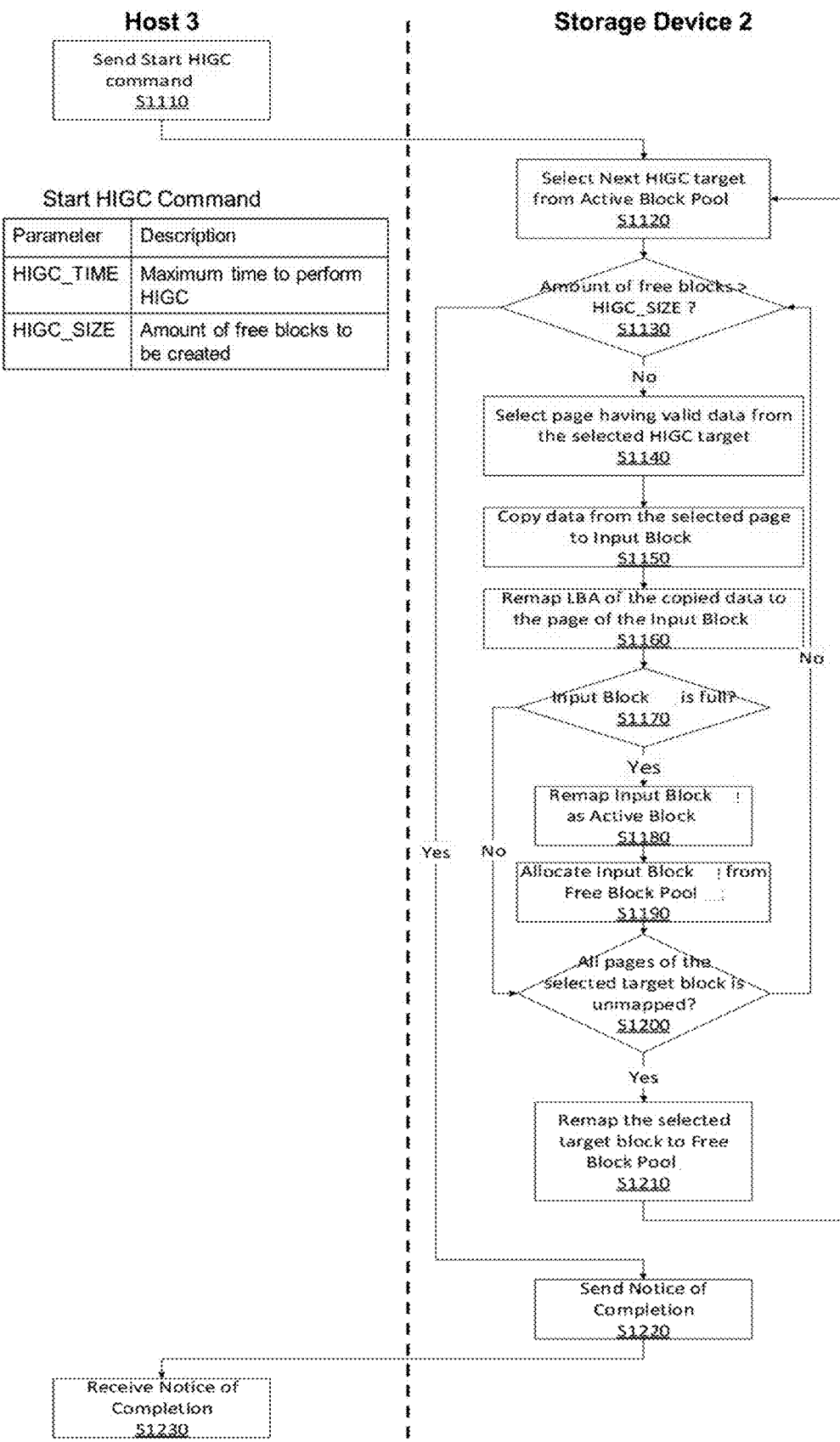
FIG. 11 illustrates a flowchart of a host-initiated garbage collection (HIGC) carried out in the storage system.

The garbage collection operation can be also initiated by the host 3. FIG. 11 illustrates a flowchart of a host-initiated garbage collection (HIGC) carried out in the storage system 1.

When the host 3 initiates the host-initiated garbage collection, in step 1110, the host 3 transmits a start host-initiated garbage collection command (Start HIGC command) to storage device 2. The Start HIGC command contains a parameter HIGC_TIME, which specifies the maximum time during which the storage device 2 is allowed to perform the host-initiated garbage collection, in unit of milliseconds, and a parameter HIGC_SIZE, which is a minimum amount of free bocks which should be created through the host-initiated garbage collection.

Upon receiving the Start HIGH command from the host 3, in step 1120, the controller 10 of the storage device 2 selects one or more target active blocks 46 from the active block pool 460. In this step, the algorithm same as or different from the one for the device-initiated garbage collection can be employed.

In step 1130, the controller 10 determines whether or not the number of free blocks 43 in the free block pool 430 is greater than the number of blocks (HIGH_SIZE) designated by the host 3. If the determination is positive (Yes in step 1130), the process proceeds to step 1220. If the determination is negative (No in step 1130), the process proceeds to step 1140.

In step 1140, the controller 10 selects one or more pages of a target active block 46 that contain valid data. Then, in step 1150, the controller 10 selects copies (transfers) the valid data from the selected pages of the target active block 46 to an input block 45 (44). In step 1160, the controller 10 updates the LUT 13, such that LBAs of the copied valid data are mapped to the pages of the input block 45 (44).

In step 1170, the controller 10 determines the input block 45 (44) becomes full by the copy of the valid data thereinto. If the determination is negative (No in step 1170), the process proceeds to step 1200. If the determination is positive (Yes in step 1170), the process proceeds to step 1180.

In step 1180, the controller 10 updates the BMT 20, such that the input block 45 (44) that are determined to become full is remapped as an active block 46. Then, in step 1190, the controller 10 updates the BMT 20, such that a free block 43 in the free block pool 430 is remapped as a new input block 45 (44).

In step 1200, the controller 10 determines whether or not all pages containing valid data were selected and the valid data have been copied to the input block 45 (44). If the determination is negative (No in step 1200), the process goes back to step 1130. If the determination is positive (Yes in step 1200), the process proceeds to step 1210.

In step 1210, the controller 10 updates the BMT 20, such that the target active block 46 is remapped as a free block 43 in the free block pool 430, and the process goes back to step 1120.

In step 1220, i.e., if the number of free blocks 43 is determined to be greater than HIGH_SIZE in step 1130, the controller 10 transmits a completion notification to the host 3. Upon receiving the completion notification from the storage device 2 in step 1230, the host-initiated garbage collection ends.

According to the host-initiated garbage collection, the host 3 can prepare a predetermined number of free blocks 43 in addition to the pre-existing free blocks 43 in the free block pool 430, even when the storage device 2 does not perform the device-initiated garbage collection. When the host 3 may write a large amount of data into the storage device 2, the host 3 can prepare space for the data by sending the Start HIGC command to the storage device 2.

[Getting Physical Fragmentation Information]

Figure 1:
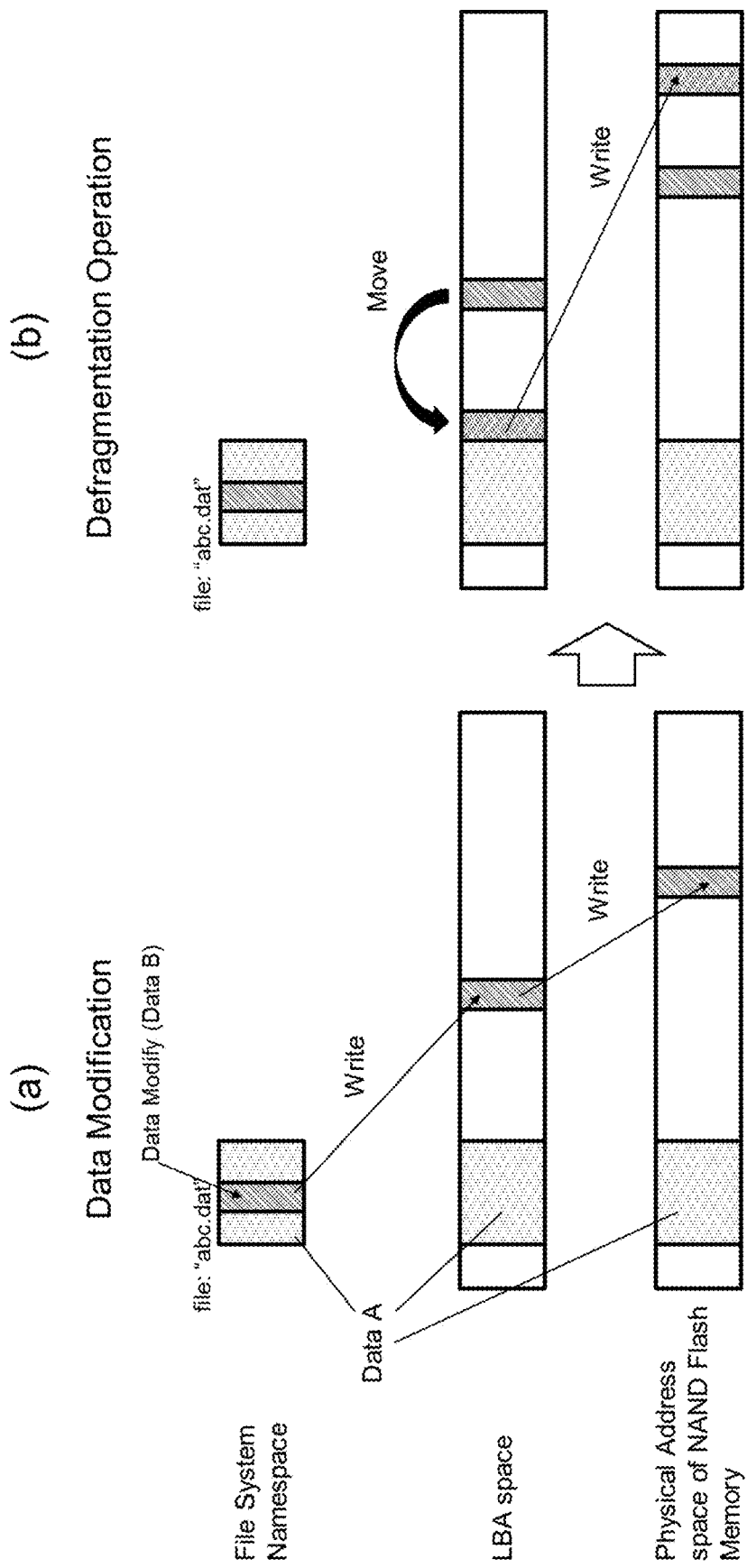
FIG. 1 schematically illustrates an example of a logical defragmentation operation carried out by a file system or an operating system.

As set forth above in FIG. 1, when part of data units in a file are re-written (updated) repeatedly, data units of the file may be defragmented in both the LBA space and in the physical address space. That is, LBAs corresponding to the data units of the file may become non-continuous, and physical addresses or physical blocks that store the data units may become non-continuous. However, the index 19 that can be referred to by the OS7 does not indicate the fragmentation in the physical address space, although the index 19 indicates the fragmentation in the LBA space. In order for the host 3 (or the OS 7) to figure out the fragmentation in the physical address space, the get physical fragmentation information (GPFI) command can be transmitted from the host 3 to the storage device 2.

Figure 12:
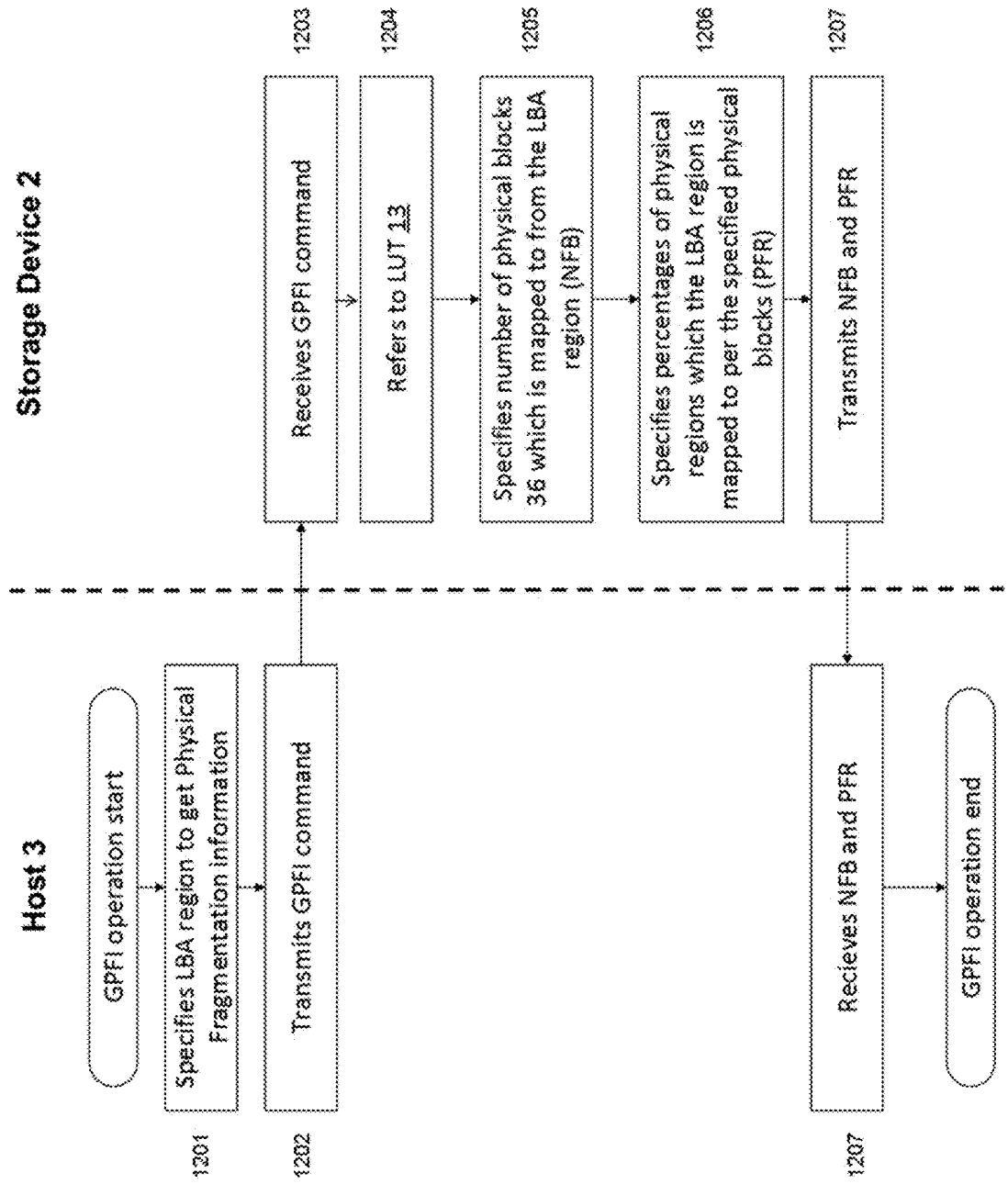
FIG. 12 illustrates a flowchart of an operation to acquire physical fragmentation information carried out in the storage system.

FIG. 12 illustrates a flowchart of an operation to acquire physical fragmentation information carried out in the storage system 1. When the operation to acquire physical fragmentation information starts, in step 1201, the host 3 specifies one or more LBA regions (ranges) for which corresponding physical fragmentation information is to be acquired. For example, when one or more LBA regions (ranges) corresponding to a file, e.g., a file to be defragmented, is specified.

Then, in step 1202, the host 3 transmits a GPFI command along with information of the specified LBA regions to the storage device 2.

In step 1203, the controller 10, by referring to the LUT 13 stored in the RAM 12, specifies physical addresses corresponding to the LBA regions received from the host 3. Then, in step 1204, the controller 10 determines the number of physical blocks (Number of Fragmented Blocks=NFB) that include the specified physical addresses. In step 1205, the controller 10, by referring to the LUT 13, calculates a ratio (percentage of fragmented region=PFR) of the size of the specified physical addresses with respect to total size of the physical blocks (fragmented blocks) that include the specified physical addresses. In step 1206, the controller 10 transmits to the host 3 the NFB and PFR, as the physical fragmentation information.

In step 1207, the host 3 receives the NFB and PFR from the storage device 2, and the operation to acquire physical fragmentation information ends. As either NFB or PFR increases, it is likely that there is more extensive fragmentation in the physical address space.

Figure 13:
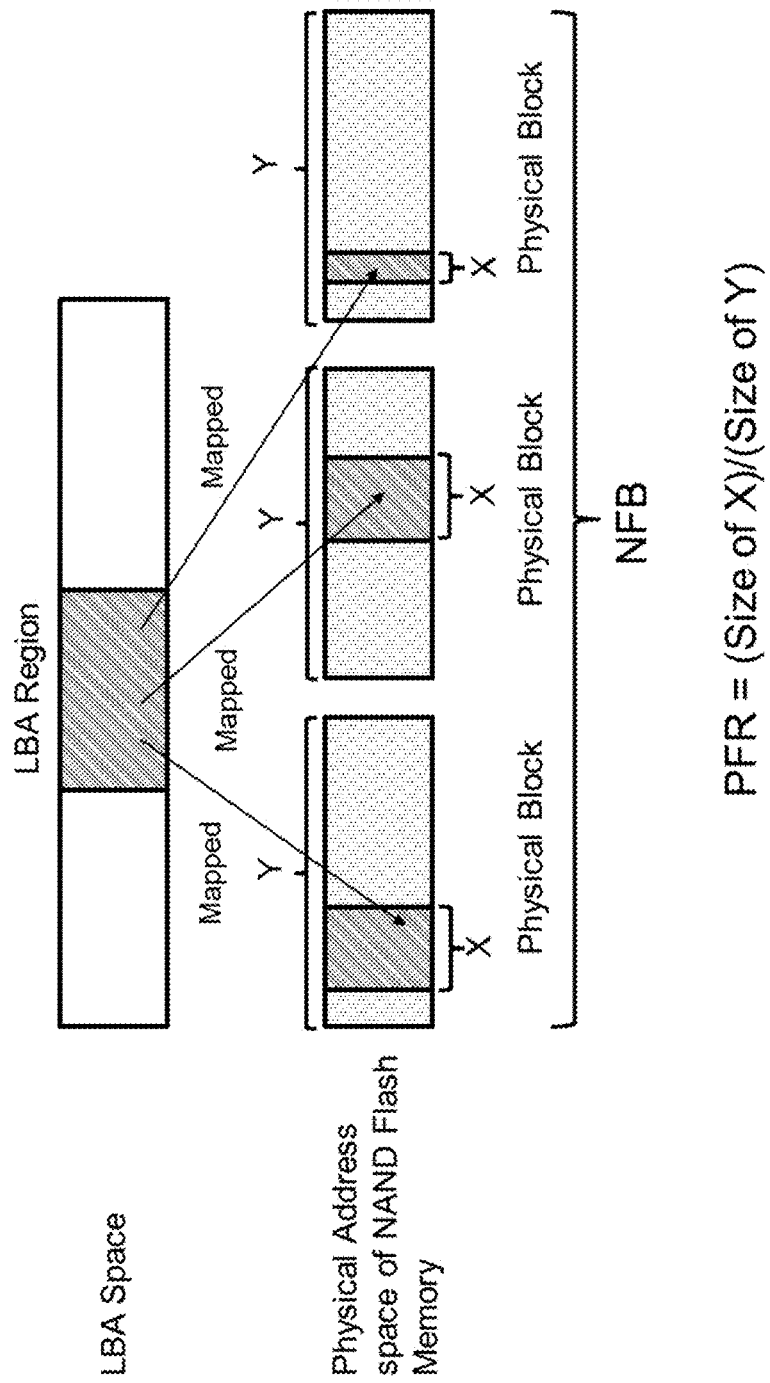
FIG. 13 schematically illustrates an example of fragmented data in a physical address space.

FIG. 13 schematically illustrates an example of fragmented data in a physical address space. Although in an LBA space, LBAs are continuous in a single LBA region, the LBAs region are mapped to three physical address ranges (X in FIG. 13) in three physical blocks, each of which has a size of Y. In FIG. 13, NFB is three, and PFR is X/Y.

[Defragmentation Operation]

Figure 14:
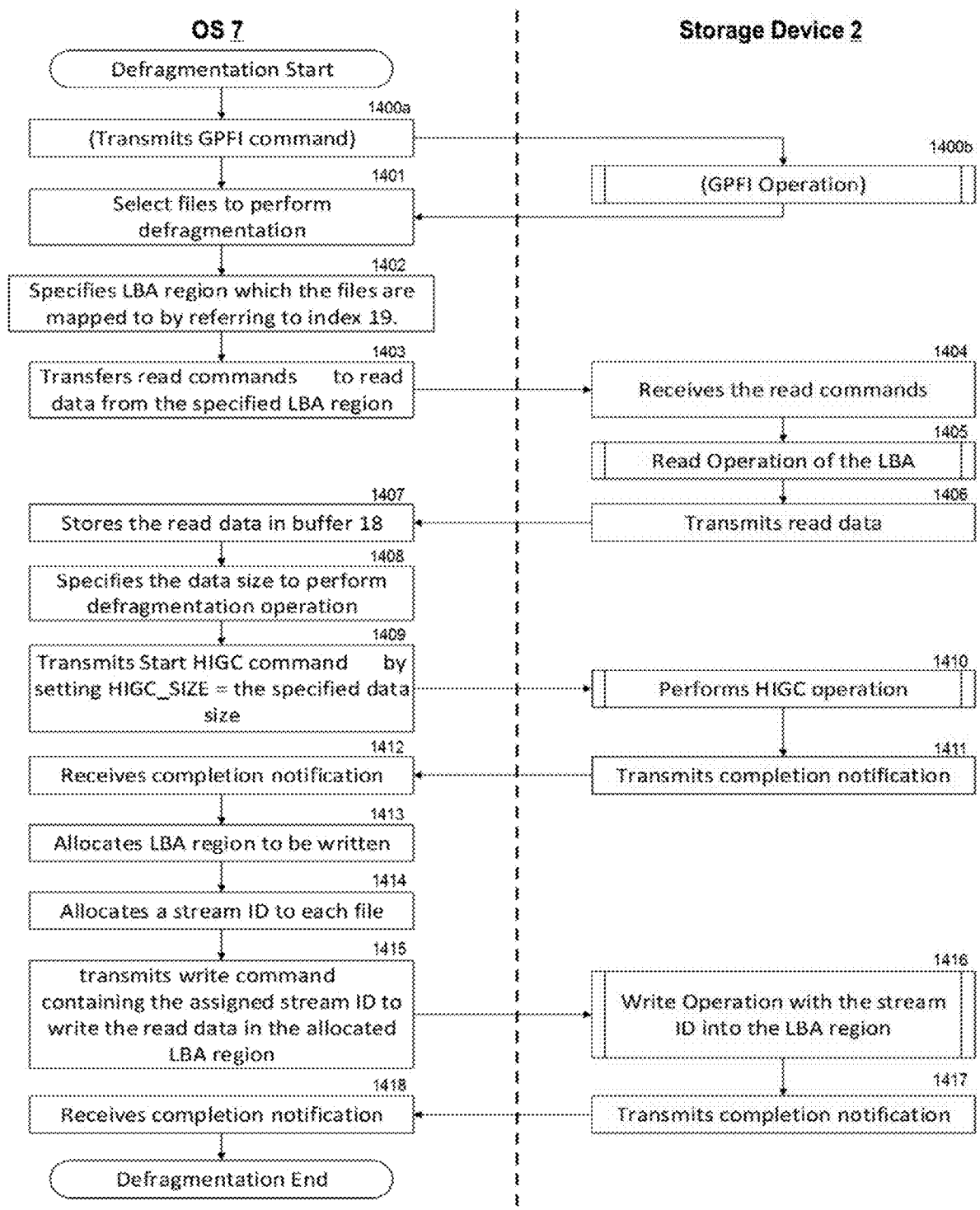
FIG. 14 illustrates a flowchart of a defragmentation operation carried out by the OS 7 and the storage device 2 of the storage system

FIG. 14 illustrates a flowchart of a defragmentation operation carried out by the OS 7 and the storage device 2 of the storage system 1 cooperatively. The defragmentation operation is initiated by the OS 7. When the defragmentation operation starts, the OS 7 opens one or more streams by transmitting one or more open stream commands to the storage device 2. In step 1400a, the OS 7 transmits the GPFI command to the storage device 2, and upon receiving the GPFI command, in step 1400b the storage device 2 carries out the operation to acquire physical fragmentation information. Steps 1400a and 1400b may be carried out in a procedure similar to the one shown in FIG. 12. Steps 1400a and 1400b are optional, and the present defragmentation operation may start from step 1401. In step 1401, the OS 7 selects one or more files (target files) to undergo the defragmentation operation by referring to the index 19. For example, files that have undergone defragmentation in the LBA space are selected as the target files. Alternatively, files that appear be fragmented based on the NFB or PFR received in response to the GPFI command may be selected as the target files if steps 1400a and 1400b are carried out.

In step 1402, the OS 7, by referring to the index 19, operates to specify one or more LBA regions in which at least part of the selected files are mapped. In step 1403, the OS 7 operates to transmit one or more read commands to the storage device 2 in order to read data of the selected files.

In step 1404, the controller 10 of the storage device 2 receives the read commands. Then, in step 1405, the controller 10 carries out a read operation in accordance with the read commands, and in step 1406, the controller 10 transmits read data to the host 3.

In step 1407, upon receiving the read data, the OS 7 operates to store the read data in the buffer 18. Then, in step 1408, the OS 7 operates to calculate a size of data that should undergo the defragmentation operation. In the present embodiment, for example, a total size of the selected files is calculated as the size of data.

In steps 1409-1412, the OS 7 and the controller 10 of the storage device 2 carry out the host-initiated garbage collection, according to a process similar to the steps shown in FIG. 11. Specifically, in step 1409, the OS 7 operates to set capacity (number of blocks) that is sufficient to store defragmented files as the parameter of HIGC_SIZE in the Start HIGC command. The sufficient capacity may be equal to or larger than the total size of the selected files.

In step 1413, the OS 7 operates to select new LBA regions that are to be mapped to the data that will undergo the defragmentation operation. In the present embodiment, for example, the OS 7 refers to the index 19 and selects an LBA region having a size equal to the total size of the selected files out of unmapped LBA regions.

In step 1414, the OS 7 operates to temporarily associate each of the selected files with one of open stream IDs. Here, stream IDs may be incrementally associated with the selected files. That is, stream IDs of 0, 1, 2, 3, . . . , and N may be associated with the selected files in this order. Alternatively, the association of stream ID may be based on a remainder obtained as a result of dividing, by the total number of streams, an integer obtained by hashing each of file names of the selected files using a hash function.

In step 1415, the OS 7 operates to transmit one or more write commands and the data of the selected files to be written in the storage device 2 according to the write commands, which are stored in the buffer 18, to the storage device 2. In steps 1415-1418, the OS 7 and the controller 10 of the storage device 2 carry out a write operation, according to a process similar to the procedure shown in FIG. 8.

In addition, the writing operation here may be carried out in parallel to the plurality of open streams. In this case, data of a plurality of files are written into the physical blocks of the storage device 2 in parallel. However, since data of the each file are written into different one of the physical blocks, associated with the particular stream ID, data of each file can be separately stored.

When the writing operation of the selected files ends, the OS 7 operates to select one or more other target files that should undergo the defragmentation operation. If there is no other target file, the open streams are closed, and the defragmentation operation ends.

According to the defragmentation operation of the above embodiment, the OS 7 and the storage device 2 cooperatively, carry out defragmentation of a physical address space, which cannot be achieved by a conventional defragmentation operation of an LBA space. Since the file that has undergone the defragmentation operation in the physical address space can be read sequentially from the physical blocks, the data reading can be carried out more quickly.

Specifically, according to the defragmentation operation of the above embodiment, the OS 7 can select an LBA region corresponding to a physically fragmented file, even if the LBA region is logically sequential in the LBA space. In contrast, when the LBA region is logically sequential, such an LBA region is not typically selected as a target for the defragmentation in a conventional defragmentation operation. After selecting the LBA region, the OS 7 operates to read data of the physically fragmented file corresponding to the LBA region and physically write the read data as one or more chunks of data larger than fragments of the file.

Moreover, according to the defragmentation operation of the above embodiment, free blocks for storing the data that undergo the defragmentation are prepared in advance. As a result, such defragmented data can be stored separately from physical blocks that store other non-defragmented data, and also writing of the defragmented data can be carried out more quickly.

Also, according to the defragmentation operation of the above embodiment, each of files that undergo the defragmentation is separately written into different input blocks associated with different stream IDs. In addition, even when the application software running over the OS is writing data to other files, files that undergo the defragmentation is separately written into different input blocks associated with different stream IDs. As a result, even if these files are written in parallel to the input blocks, the files can be separately stored file by file. As a result, the application software running over the OS can access each of the file more quickly and through fewer processes, which can suppress further fragmentation of the files in the physical address space.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A host device connectable to a storage device that comprises a nonvolatile semiconductor memory including a plurality of physical blocks, the host device comprising:
    an interface configured to communicate with the storage device; and
    a processor configured to
        determine logical addresses corresponding to a target file that is to undergo a physical defragmentation operation,
        issue through the interface a read command that includes the logical addresses to the storage device, and
        issue through the interface a write command that includes the logical addresses and write data associated with the write command, wherein data received from the storage device in response to the read command is issued as the write data associated with the write command, to cause the storage device to store the write data in one or more physical blocks of the plurality of physical blocks, so that the data associated with the logical addresses of the file are physically defragmented within the storage device.

2. The host device according to claim 1, wherein
the processor is further configured to carry out logical defragmentation of the target file such that the logical addresses corresponding to the target file become consecutive prior to sending the read command.

3. The host device according to claim 2, wherein
the write command references new logical addresses that are consecutive and different from the determined logical addresses.

4. The host device according to claim 1, wherein
the write command includes a stream number and causes the storage device to perform a write operation on the write data in one or more physical blocks that are associated with the stream number.

5. The host device according to claim 1, wherein
the one or more physical blocks in the plurality of physical blocks are different from physical blocks in the plurality of physical blocks that store non-defragmented data.

6. The host device according to claim 5, wherein
the processor is further configured to instruct the storage device to prepare a certain number of the one or more physical blocks to store no valid data, by sending the certain number to the storage device, after receiving the data associated with the logical addresses and prior to sending the write command.

7. The host device according to claim 6, wherein
the storage device prepares the certain number of free blocks by selectively transferring valid data stored in one or more target physical blocks to one or more destination physical blocks and then invalidating all data stored in the target physical blocks.

8. The host device according to claim 1, wherein
the data of the file that are physically defragmented are stored in one or more physical blocks in the plurality of physical blocks so that the data can be read sequentially from the one or more physical blocks.

9. The host device according to claim 1, wherein
the processor is further configured to determine the target file based on a mapping of files to logical addresses.

10. The host device according to claim 1, wherein
the processor is further configured to select the target file from files that have undergone a logical defragmentation operation in which logical addresses of the target file are selected to be continuous.

11. The host device according to claim 1, wherein
the processor is further configured to:
send to the storage device a request for physical fragmentation information for the logical addresses of the target file, and
determine the target file based on the physical fragmentation information received from the storage device.

12. The host device according to claim 11, wherein
the physical fragmentation information indicates a number of physical blocks that include physical addresses corresponding to the logical addresses of the target file, a ratio of the size of the specified physical addresses with respect to a total size of the physical blocks that include the physical addresses, or a combination of both.

13. A method performed by a host device connectable to a storage device that comprises a nonvolatile semiconductor memory including a plurality of physical blocks, the method comprising:
determining logical addresses corresponding to a target file that is to undergo a physical defragmentation operation;
issuing a read command that includes the logical addresses to the storage device; and
issuing a write command that includes the logical addresses and write data associated with the write command, wherein data received from the storage device in response to the read command is issued as the write data associated with the write command, to cause the storage device to store the write data in one or more physical blocks of the plurality of physical blocks, so that the data associated with the logical addresses of the file are physically defragmented within the storage device.

14. The method according to claim 13, further comprising:
carrying out logical defragmentation of the target file such that the logical addresses corresponding to the target file become consecutive prior to sending the read command.

15. The method according to claim 13, wherein
the write command includes a stream number and causes the storage device to perform a write operation on the write data in one or more physical blocks that are associated with the stream number.

16. The method according to claim 13, wherein
the one or more physical blocks in the plurality of physical blocks are different from physical blocks in the plurality of physical blocks that store non-defragmented data.

17. The method according to claim 13, wherein
the data of the file that are physically defragmented are stored in one or more physical blocks in the plurality of physical blocks so that the data can be read sequentially from the one or more physical blocks.

18. The method according to claim 13, further comprising:
determining the target file based on a mapping of files to logical addresses.

19. The method according to claim 13, further comprising:
selecting the target file from files that have undergone a logical defragmentation operation in which logical addresses of the target file are selected to be continuous.

20. The method according to claim 13, further comprising:
sending to the storage device a request for physical fragmentation information for the logical addresses of the target file, and
determining the target file based on the physical fragmentation information received from the storage device.

* * * * *